(12) United States Patent
Perez Rojo

(10) Patent No.: US 9,718,304 B2
(45) Date of Patent: Aug. 1, 2017

(54) CENTER CAP FOR A MOTOR VEHICLE WHEEL INCLUDING INTERNAL RELEASE LEVER

(71) Applicant: FORD GLOBAL TECHNOLOGIES, LLC, Dearborn, MI (US)

(72) Inventor: Gerardo Alejandro Perez Rojo, Metepec (MX)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/739,430

(22) Filed: Jun. 15, 2015

(65) Prior Publication Data

US 2016/0361948 A1    Dec. 15, 2016

(51) Int. Cl.
*B60B 7/06* (2006.01)
*B60B 7/00* (2006.01)
*B60B 7/08* (2006.01)

(52) U.S. Cl.
CPC ............ *B60B 7/066* (2013.01); *B60B 7/0013* (2013.01); *B60B 7/0073* (2013.01); *B60B 7/08* (2013.01)

(58) Field of Classification Search
CPC .............................. B60B 7/066; B60B 7/0013
USPC ..... 301/37.101, 37.102, 37.21, 37.34, 37.31, 301/37.32, 37.33, 37.35, 37.36, 37.106, 301/108.1, 108.5
See application file for complete search history.

(56) References Cited

U.S. PATENT DOCUMENTS

| | | | | |
|---|---|---|---|---|
| 2,726,900 A * | 12/1955 | Stanetzki | .................. | B60B 3/14 301/35.61 |
| 3,893,689 A * | 7/1975 | Verhoff | .................. | B60B 11/02 301/37.31 |
| 4,067,621 A * | 1/1978 | Reppert | .................... | B60B 7/00 301/108.3 |
| 4,108,497 A * | 8/1978 | Smith | ..................... | B60B 37/10 301/37.41 |
| 4,547,021 A * | 10/1985 | Abbate Daga | .......... | B60B 7/068 301/108.3 |
| 6,206,479 B1 * | 3/2001 | Jackman | ............... | B60B 7/0013 301/108.1 |
| 6,857,708 B2 * | 2/2005 | Hartl | ........................ | B60B 7/04 301/108.1 |

(Continued)

FOREIGN PATENT DOCUMENTS

DE    10318407 A1    11/2004
EP    1736325 A2    2/2005

(Continued)

OTHER PUBLICATIONS

English machine translation for DE10318407.

(Continued)

*Primary Examiner* — S. Joseph Morano
*Assistant Examiner* — Jean Charleston
(74) *Attorney, Agent, or Firm* — Jason Rogers; King & Schickli, PLLC

(57) ABSTRACT

A center cap is provided for a motor vehicle wheel. The center cap comprises a body having a front side and a rear side. A recess lever is carried on the rear side. An access aperture is provided in the body. The access aperture extends through the body and opens to the release lever whereby the release lever may be engaged and displaced from a lock position to a release position to allow removal of the center cap from the wheel.

10 Claims, 6 Drawing Sheets

(56) References Cited

U.S. PATENT DOCUMENTS

| | | | | |
|---|---|---|---|---|
| 7,651,171 B2 * | 1/2010 | Kinslow | ................... | B60B 7/10 |
| | | | | 301/108.1 |
| 8,764,122 B1 * | 7/2014 | Chalk | .................... | B60B 3/001 |
| | | | | 301/111.03 |
| 9,321,304 B2 * | 4/2016 | Wildey | ................... | B60B 7/066 |
| 2007/0228807 A1 * | 10/2007 | Leslie | .................. | B60B 7/0013 |
| | | | | 301/37.26 |
| 2009/0058177 A1 * | 3/2009 | Berens | ................. | B60B 7/0013 |
| | | | | 301/37.25 |
| 2015/0251488 A1 * | 9/2015 | Hoff | ......................... | B60B 7/16 |
| | | | | 301/37.21 |

FOREIGN PATENT DOCUMENTS

| | | |
|---|---|---|
| JP | H08324204 A | 9/2000 |
| JP | 2002293106 A | 10/2002 |
| JP | 2005153804 A | 6/2005 |
| KR | 100199761 B1 | 6/1999 |
| KR | 20110132914 A | 12/2011 |

OTHER PUBLICATIONS

English machine translation for KR100199761.
English machine translation for JPH08324204.
English machine translation for JP2002293106.
English machine translation for KR2005153804.
English machine translation for KR20110132914.

\* cited by examiner

CENTER CAP FOR A MOTOR VEHICLE WHEEL INCLUDING INTERNAL RELEASE LEVER

TECHNICAL FIELD

This document relates generally to the motor vehicle equipment field and, more particularly, to a center cap for a motor vehicle wheel incorporating an integral and internal release lever allowing the center cap to be easily released from the motor vehicle wheel when desired.

BACKGROUND

Many center caps for a motor vehicle wheel incorporate a thin chromium plating in order to provide a desired chrome appearance. Many times this plating is damaged when one utilizes a tool to remove the center cap from the wheel.

This document relates to a new and improved center cap that may be easily removed from its fixed position in the motor vehicle wheel without damaging the plating on the center cap. This is accomplished utilizing a simple punch that is inserted through a very small hole or aperture in the face of the center cap that does not compromise the aesthetic appearance of the center cap.

SUMMARY

In accordance with the purposes and benefits described herein, a center cap is provided for a motor vehicle wheel. That center cap comprises a body having a front side and a rear side. A release lever is carried on the rear side of the body. Further, an access aperture is provided in the body. That aperture opens to the release lever whereby the release lever may be engaged and displaced from a lock position to a release position to allow removal of the center cap from the wheel.

In one possible embodiment, the rear side includes a recess and the release lever is held within the recess when the release lever is in the lock position. In one possible embodiment, the release lever is connected to the body by means of a pivot. That pivot may be provided at substantially a midline of the release lever.

Still further, in one possible embodiment, the body further includes at least one resilient locking element or "snap fit" engaging and securing the center cap to the motor vehicle wheel. In one particularly useful embodiment, the body further includes a plurality of resilient locking elements that project rearwardly from the rear side for engaging and securing the center cap to the motor vehicle wheel. Each locking element of the plurality of locking elements includes a locking lug on a distal end thereof. The locking lugs and the plurality of locking elements are radially arrayed around the center cap to engage the motor vehicle wheel to which the center cap is connected.

In a particularly useful embodiment, the access aperture has a total cross sectional area of less than 5.0 mm$^2$. This ensures that the access aperture does not in any way compromise the aesthetic appearance of the center cap. A punch is provided for inserting into the access aperture, engaging and pivoting the release lever and releasing the center cap from the motor vehicle wheel. In accordance with an additional aspect, a motor vehicle is provided equipped with the center cap described.

In accordance with yet another aspect, a method is provided of releasing a center cap from a motor vehicle wheel. That method may be broadly described as comprising the step of inserting a punch through an access aperture in the center cap and engaging and pivoting a release lever on the center cap to generate a force necessary to remove the center cap from the motor vehicle wheel.

More specifically, the method may include the step of pushing in a first direction with the punch against the release lever at a first end of the release lever and pushing in a second direction against the center cap with a second end of the release lever as the release lever is pivoted so as to provide a removal force to the center cap.

The method may also include mounting the release lever to the center cap on a rear side of the center cap. In addition, the method may also include the step of holding the release lever within a recess formed on the rear side of the center cap when the center cap is secured to the motor vehicle wheel. Still further, the method may include the step of securing the center cap to the motor vehicle wheel by means of a plurality of resilient locking elements. It is these resilient locking elements that are released from the wheel by actuation of the release lever to allow removal of the center cap from the wheel.

In the following description, there are shown and described several preferred embodiments of the center cap. As it should be realized, the center cap is capable of other, different embodiments and its several details are capable of modification in various, obvious aspects all without departing from the center cap as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the center cap and together with the description serve to explain certain principles thereof. In the drawing figures.

Figure 1:
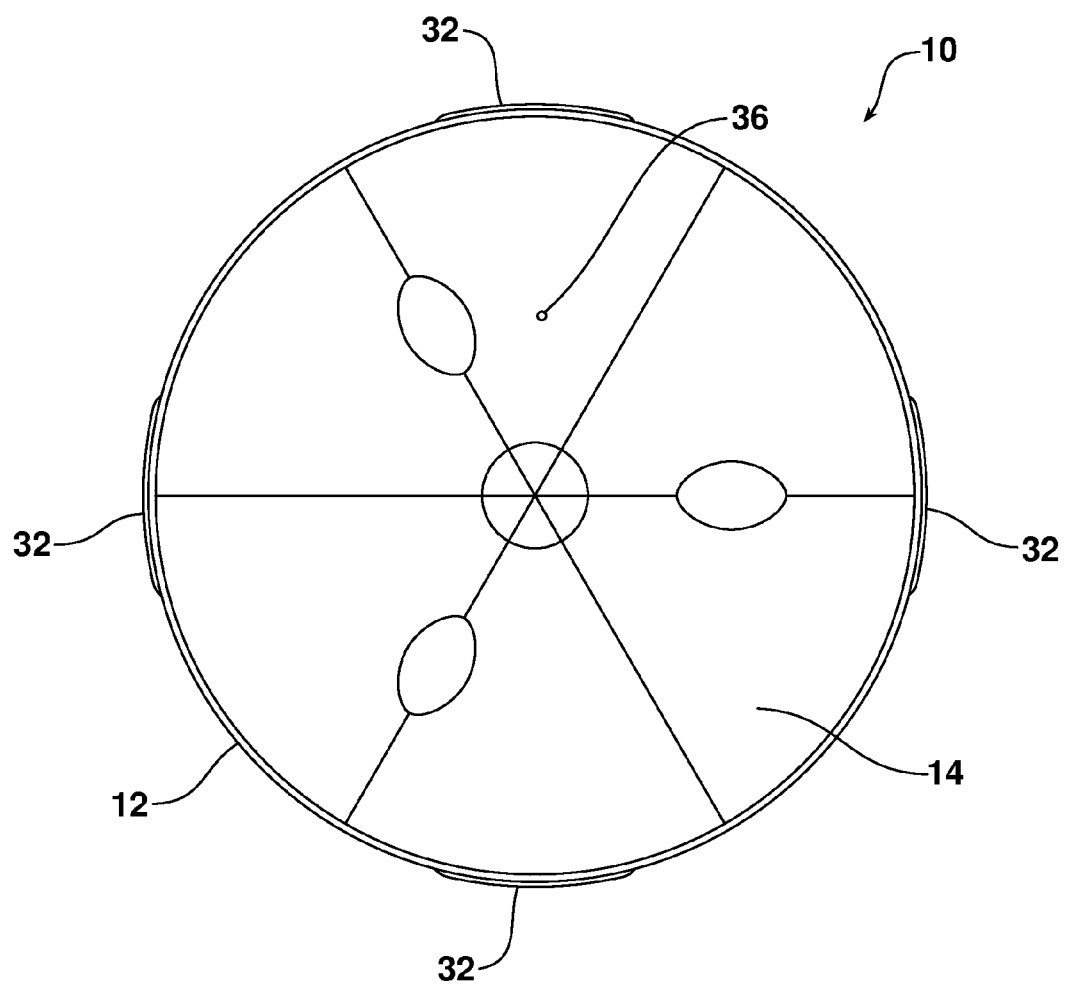
FIG. 1 is a front elevational view of the center cap.

Reference will now be made in detail to the present preferred embodiments of the center cap, examples of which are illustrated in the accompanying drawing figures.

DETAILED DESCRIPTION

Reference is now made to FIGS. 1-4 illustrating the center cap 10 that is the subject matter of this document. The center cap 10 includes a body 12 having a front side 14 and a rear side 16. A release lever 18 is carried on the rear side 16 of the body 12.

Figure 2:
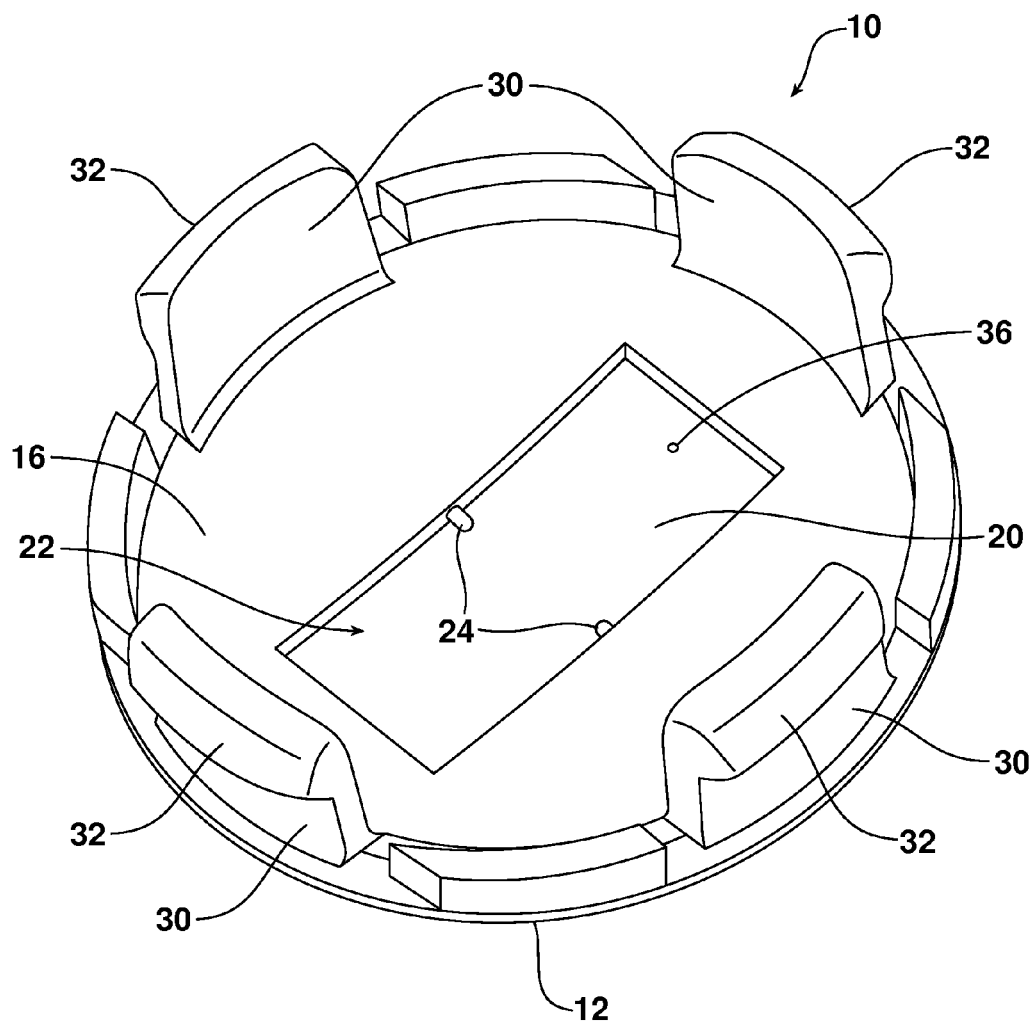
FIG. 2 is a rear perspective view of the center cap illustrating the recess and pivot that receive and hold the release lever and the plurality of locking elements radially arrayed around the center cap.
Figure 3:
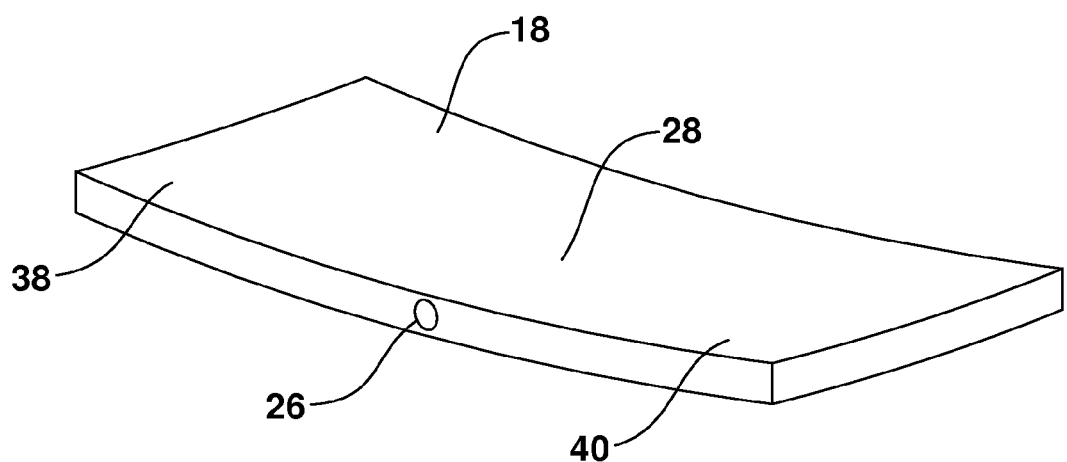
FIG. 3 is a perspective view of the release lever.
Figure 4:
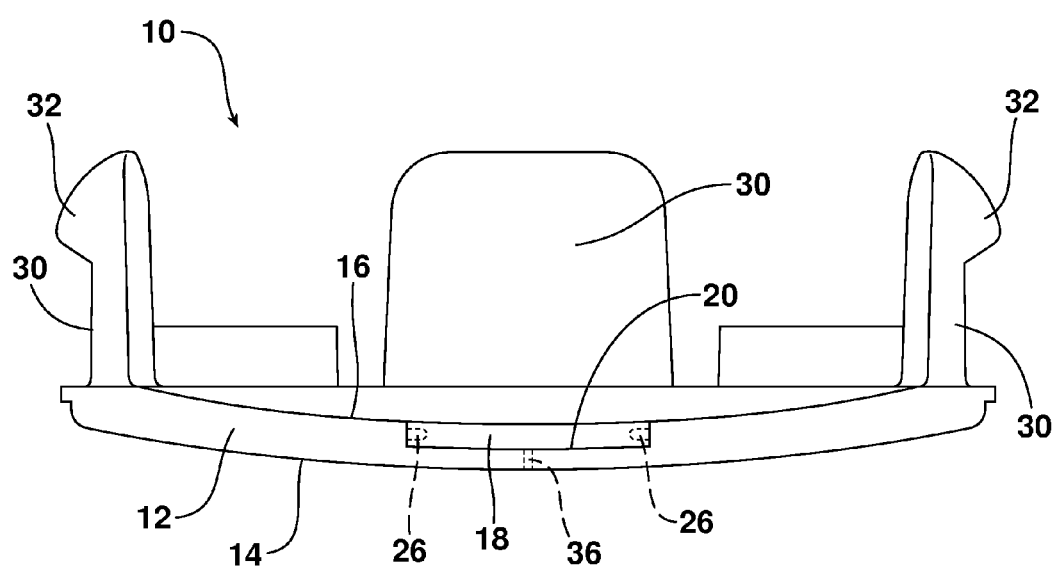
FIG. 4 is a cross-sectional view illustrating how the release lever is mounted on the pivots and held within the recess of the center cap.

More specifically, as illustrated in FIG. 2, the rear side 16 of the body 12 includes a recess 20 and a pivot 22. The pivot 22 is formed by two opposed stub shafts 24. The release lever 18 includes two cooperating opposed apertures 26 at or adjacent to the midline 28 that receive the stub shafts 24 so that the release lever is pivotally mounted to the body 12. As illustrated in FIG. 4, when the center cap 10 is in a home or a lock position, the release lever 18 is held within the recess 20 on the stub shafts 24. Here it should be noted that the release lever 18 is arcuate in side profile and end profile (see FIGS. 3, 4 and 5a) in order to properly nest in the recess 20 of the slightly concave body 12.

Figure 5A:
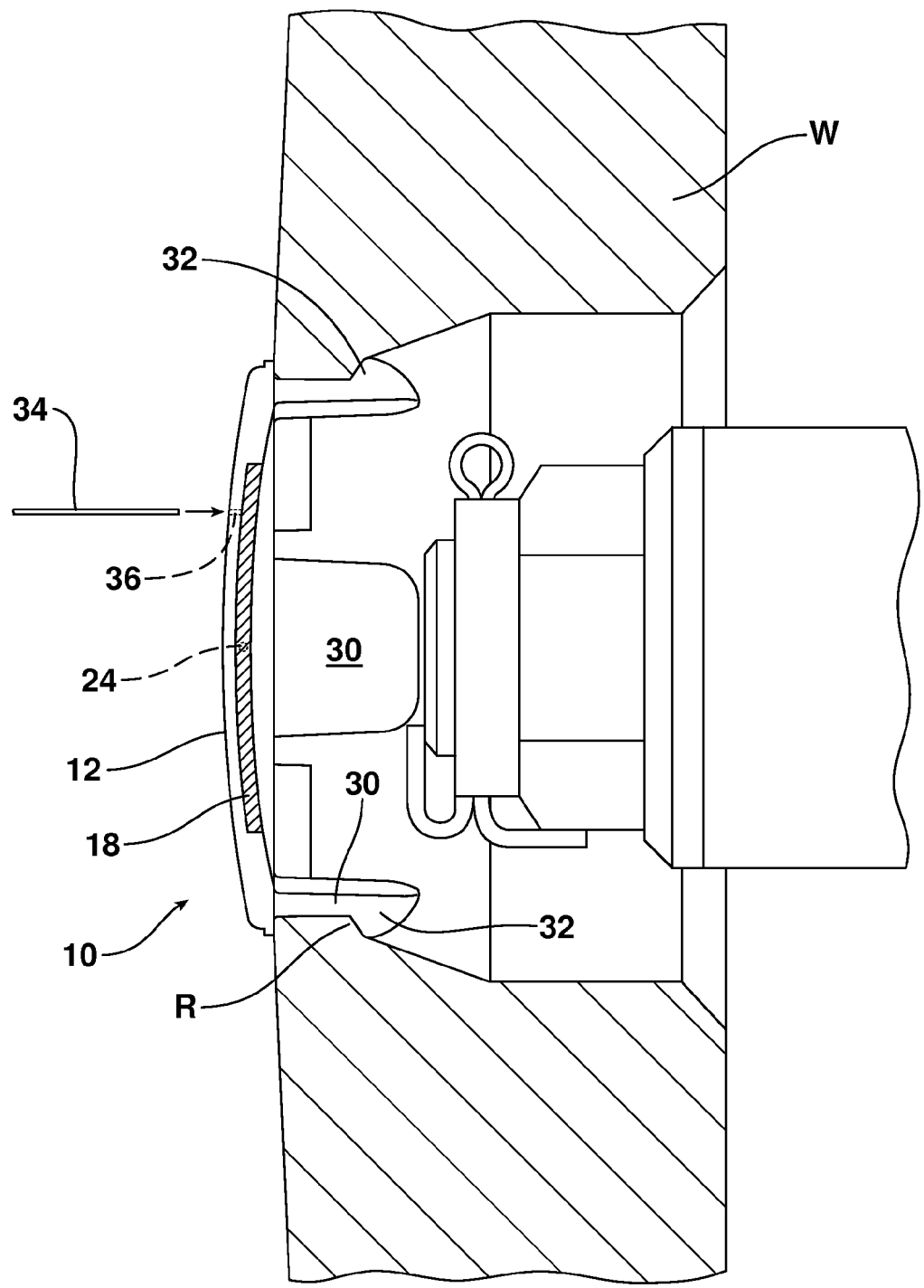
FIGS. 5a and 5b are cross-sectional views with FIG. 5a illustrating the center cap in the lock position on the motor vehicle wheel and FIG. 5b illustrating how the release lever is pivoted to remove the center cap from the wheel.

As further illustrated in FIGS. 1 and 2, the body 12 also includes at least one resilient locking element 30. In the illustrated embodiment a plurality of four resilient locking elements 30 are shown projecting rearwardly from the rear side 16 of the body 12. As illustrated in FIG. 5a, these resilient locking elements 30 engage and secure the center cap 10 to a motor vehicle wheel W. More specifically a locking lug 32 on a distal end of each locking element 30 projects radially outwardly from the plurality of locking elements 30 and functions to engage a lip or rib R to secure the center cap 10 to the wheel W. As illustrated in FIG. 5a, when the center cap 10 is secured to the wheel W, the release lever 18 rests within the recess 20.

Figure 5B:
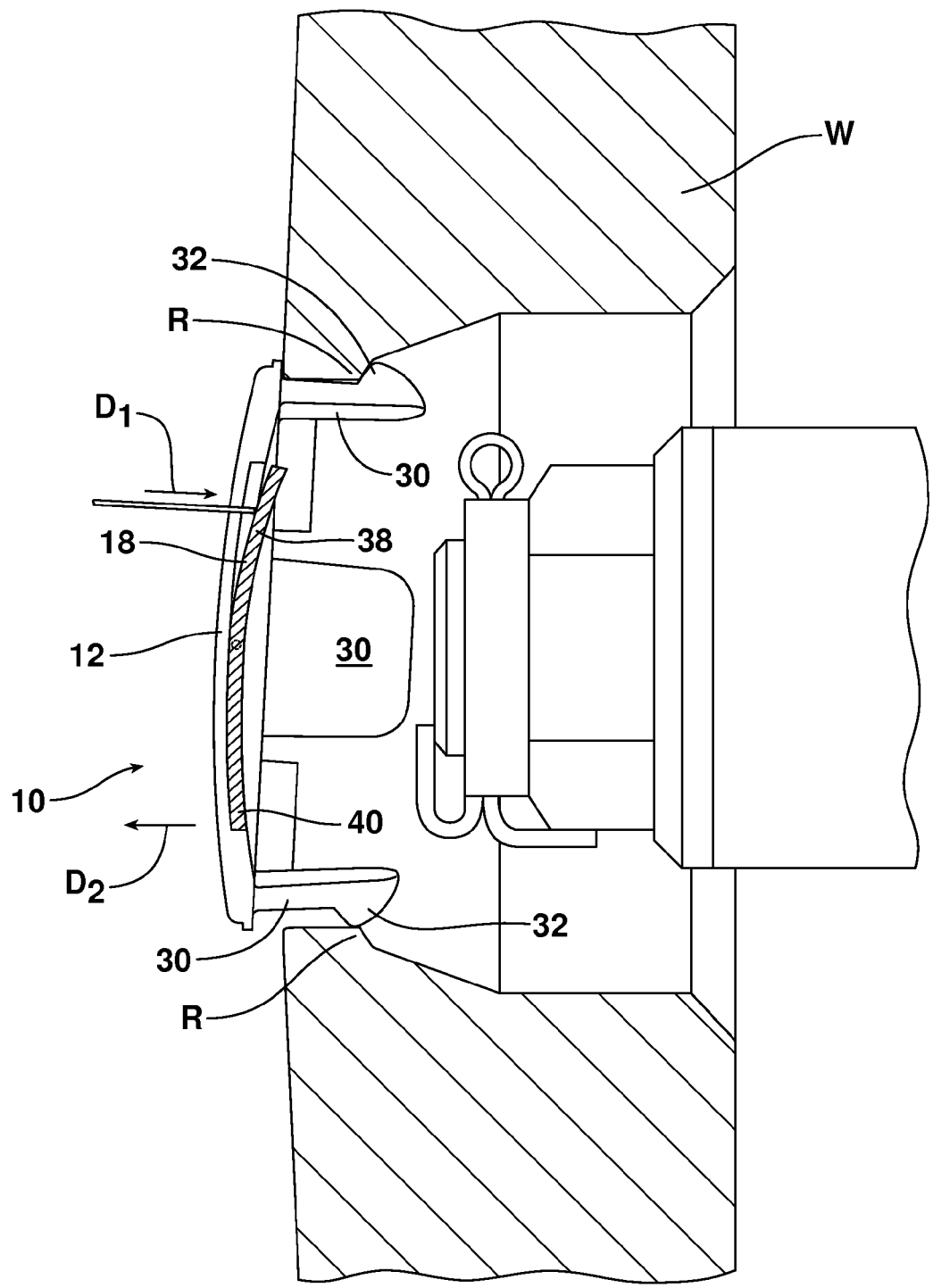

When one desires to remove the center cap 10 from the wheel W, one utilizes the punch 34 (see FIGS. 5a and 5b). More specifically, the punch 34 is inserted into an access aperture 36 that is provided in the body 12. That access aperture extends through the body 12 opening to the face of the release lever 18. As the punch 34 is inserted through the access aperture 36 it engages the release lever 18. By pushing the punch 34 further into the access aperture 36 (note action arrow $D_1$), the release lever 18 is engaged at a first end 38 and pivoted about the stub shafts 24 while a second end 40 of the release lever pushes against the body 12. This generates a removal force in the direction of action arrow $D_2$ that overcomes the retention force provided by the locking elements 30. More specifically, the resilient locking elements 30 bend inwardly so that the locking lugs 32 pass over the locking rib 30 in the wheel W and the center cap 10 is easily removed without engaging or damaging the finish on the front side or face 14 of the center cap.

Since the punch 34 is supported by the side wall of the body 12 around the access aperture 36, the punch 34 may be made with a relatively small diameter. Accordingly, the access aperture 36 may have a relatively small total cross-sectional area of, for example, less than 5.0 mm². Thus, the access aperture 36 is very small and does not adversely affect the aesthetic appearance of the center cap 10 in any way. In fact, unless you know the access aperture 36 is there the access aperture is likely to go unnoticed.

As should be appreciated, the center cap 10 functions in a method of releasing a center cap from a motor vehicle wheel W. That method may be broadly described as comprising the steps of inserting a punch 34 through an access aperture 36 in the body 12 of the center cap 10 and engaging and pivoting the release lever 18 on the center cap to generate a force necessary to remove the center cap from the motor vehicle wheel.

That method may further be described as including the steps of pushing with the punch 34 in a first direction $D_1$ against the first end 38 of the release lever 18 and pushing in a second direction $D_2$ against the body 12 with a second end 40 of the release lever as the release lever is pivoted to provide the necessary force for removing the center cap 10 from the wheel. That force depends on the geometry and material used for the center cap 10.

As should also be appreciated, the method may include the step of mounting the release lever 18 to the center cap of the body on the rear side of the center cap. Further the method may include the step of holding the release lever 18 within a recess 20 formed on the rear side 16 of the center cap 10 when the center cap is secured to the motor vehicle wheel W. Still further, the method may include the step of securing the center cap 10 to the motor vehicle wheel W by means of a plurality of resilient locking elements 30 as previously described and illustrated in FIG. 5a.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A center cap for a motor vehicle wheel, comprising:
 a body having a front side and a rear side, wherein said rear side includes a recess;
 a release lever carried on said rear side, wherein said release lever is held within said recess when said release lever is in a lock position; and
 an access aperture in a body opening to said release lever whereby said release lever may be engaged and displaced from said lock position to a release position to allow removal of said center cap from the wheel.

2. The center cap of claim 1, wherein said release lever is connected to said body by means of a pivot.

3. The center cap of claim 2, wherein said pivot is provided at substantially a midline of said release lever.

4. The center cap of claim 3, wherein said body further includes at least one resilient locking element engaging and securing said center cap to said motor vehicle wheel.

5. The center cap of claim 3, wherein said body further includes a plurality of resilient locking elements projecting rearwardly from said rear side for engaging and securing said center cap to said motor vehicle wheel.

6. The center cap of claim 5, wherein each locking element of said plurality of locking elements includes a locking lug on a distal end thereof, said locking lugs on said plurality of locking elements being radially arrayed around said center cap.

7. The center cap of claim 3, wherein said access aperture has a total cross sectional area of less than 5.0 mm².

8. The center cap of claim 7, further including a punch for inserting into said access aperture, engaging and pivoting said release lever and releasing said center cap from the motor vehicle wheel.

9. The center cap of claim 1, wherein said release lever is arcuate in profile.

10. A motor vehicle wheel equipped with the center cap set forth in claim 1.

* * * * *